(12) United States Patent
Stauffer

(10) Patent No.: US 6,391,186 B1
(45) Date of Patent: May 21, 2002

(54) ELECTROCHEMICAL PROCESS FOR REMOVING IONS FROM SOLUTION

(76) Inventor: John E. Stauffer, 6 Pecksland Rd., Greenwich, CT (US) 06831

( * ) Notice: Subject to any disclaimer, the term of this patent is extended or adjusted under 35 U.S.C. 154(b) by 0 days.

(21) Appl. No.: 09/685,391

(22) Filed: Oct. 10, 2000

Related U.S. Application Data

(63) Continuation-in-part of application No. 09/201,189, filed on Nov. 30, 1998, now abandoned.

(51) Int. Cl.[7] .................................................. C02F 1/461
(52) U.S. Cl. ........................ 205/702; 205/742; 205/753; 205/754
(58) Field of Search ................................ 205/742, 753, 205/754, 702

(56) References Cited

U.S. PATENT DOCUMENTS

| | | |
|---|---|---|
| 3,716,459 A | 2/1973 | Salter et al. |
| 3,888,756 A * | 6/1975 | Teshima et al. ......... 205/275.1 |
| 4,004,994 A | 1/1977 | Andrus |
| 5,512,144 A | 4/1996 | Stauffer ...................... 205/763 |
| 6,010,604 A | 1/2000 | Stauffer ...................... 204/242 |

* cited by examiner

Primary Examiner—Arun S. Phasge
(74) Attorney, Agent, or Firm—Young & Basile

(57) ABSTRACT

An electrochemical process, for removing or modifying ions in solution, incorporates an electrolytic cell comprising a bipolar bed of conductive and non-conductive cell particulate material spaced between two electrodes across which an electrical voltage is applied causing the removal or modification of the ions. A certain minimum of non-conductive particulates in the bed is required to prevent the bed from shunting. The solution contains anions or cations or both, which are to be destroyed, transformed to other species, plated onto the electrode or otherwise modified. The bed acts as a bipolar electrode because it contains both positively and negatively charged sites so that the cations migrate to the negatively charged sites and the anions to the positively charged sites to undergo electrochemical reactions. The electric current in the cell can flow in either direction to achieve the same result so an alternating current is as effective as a direct current.

4 Claims, 1 Drawing Sheet

ELECTROCHEMICAL PROCESS FOR REMOVING IONS FROM SOLUTION

CROSS REFERENCE TO RELATED APPLICATIONS

This application is a continuation-in-part of U.S. application Ser. No. 09/201,189, filed Nov. 30, 1998, now abandoned.

FIELD OF THE INVENTION

A process has been developed for the removal of ions from solution. The process incorporates an electrolytic cell in which particulate material is spaced between two electrodes. A bed of particulates acts as a bipolar electrode which removes or destroys ions as the solution flows through the bed. The unique feature of the process is the composition of the bed which comprises a mixture of both electrically conductive and non-conductive material. The scheme provides for the efficient removal of the ions.

BACKGROUND OF THE INVENTION

Andrus in U.S. Pat. No. 4,004,994 discloses a process for the electrochemical removal of contaminants from solutions. This process makes use of an electrolytic cell which comprises a bipolar bed of conductive particles. As a current is passed through the cell, ions are attracted to the bipolar electrode and are either destroyed or plated out. Usually such a process is designed to treat waste streams from plating operations and other metal finishing processes. Typically these waste streams contain low concentrations of salts which present environmental hazards.

Although the use of such bipolar processes shows much promise, they are handicapped by operational difficulties. Generally the concentrations of ions in the waste streams are low, and thus the electrical resistance of such liquids is high. On the other hand, the electrical resistance of the bipolar bed is relatively low. The result of this mismatch is that a large portion of the electrical current is shunted or short-circuited through the bipolar bed without producing an electrochemical effect.

Several steps have been proposed to improve the efficiency of bipolar beds. Andrus focuses attention on the contact resistance between the particles in the bipolar bed. This contact resistance can be modified within limits by controlling the compaction of the particles, the shape and sizes of the particles, and the flow rate of the solution through the bed.

An alternative approach has been proposed by Salter et al. in U.S. Pat. No. 3,716,459. This process depends on the application of a restricted fluidized bed in which the bipolar particles undergo movement and the bed is allowed to expand to a limited extent. In such a fashion the electrical contact between particles can be controlled.

More recently, U.S. Pat. No. 6,010,604 disclosed a neural network packing for use in the scrubbing of gages by an aqueous liquid. The packing comprises pieces of material that are electrically conductive and pieces of another material that are non-conductive. These pieces are randomly intermixed and spaced between two electrical contacts. This packing, while showing considerable promise, is restricted to the use of scrubbing gases.

Therefore, it is an object of the present invention to utilize the best features of the prior art to achieve a process designed to treat solutions by passing such solutions through an electrolytic cell to remove or otherwise alter dissolved ions.

Furthermore, it is an object to provide for a process that is efficient in operation and easy to use.

These and other objects, features and advantages of the invention will be apparent from the accompanying drawing and the following description.

SUMMARY OF THE INVENTION

Figure 1:
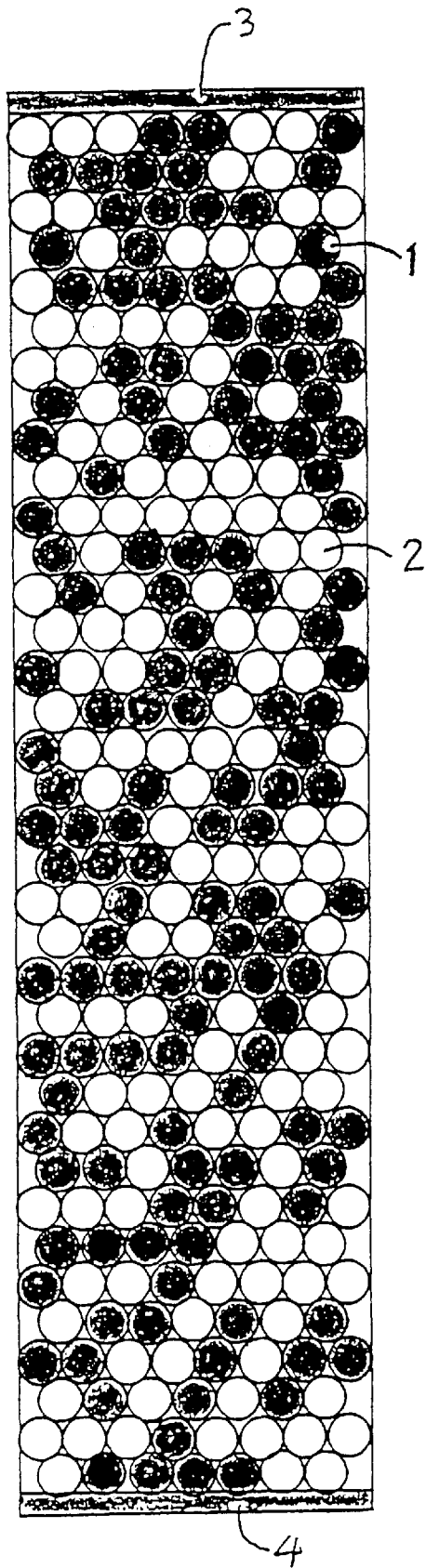
FIG. 1 is a schematic representation of a randomly packed bipolar bed containing particulates that are electrically conductive (shaded black) and non-conductive (white). The ratio of such conductive to non-conductive particles shown in this representation is 50 to 50.

A process is provided for the removal of ions from solution by means of electrolysis. In one preferred embodiment, the invention concerns a bipolar cell that comprises particulates (sometimes referred to herein as particles) spaced between two opposing electrodes 3, 4 across which an electrical voltage is applied. Some of the particulates are electrically conductive and some are non-conductive. The conductive and non-conductive particulates are intimately mixed to form a bed of random composition. In theory, the proportion of conductive to non-conductive particles may vary from one extreme, all conductive, to the other extreme, all non-conductive. In practice, the proportion will depend on, among other factors, the geometry of the cell. The average proportion of conductive to non-conductive particulates in sufficient to form strands or clumps of conductive particulates, but less than the lowest proportion which causes an electrical shunt between the electrical contacts.

The process allows for the passage of the solution through the electrolytic cell. This solution contains ions, either anions or cations or both, which are to be destroyed, transformed to other species, plated out on the electrode or otherwise modified. The ions are attracted to electrically charged sites on the particulates in the bed. Such a bed acts as a bipolar electrode because it contains both positively and negatively charged sites. Thus, the cations migrate to the negatively charged sites and the anions to the positively charged sites where they undergo electrochemical reactions.

It is immaterial which cell electrode is positive and which is negative. The electric current can flow in either direction to achieve the same result. In fact, since the bipolar electrode possesses electrical symmetry, an alternating current is just as effective as a direct current. Some advantages might thereby be gained in the supply of electrical power to the process.

DETAILED DESCRIPTION OF THE PREFERRED EMBODIMENTS

The present invention overcomes the limitations of the prior art by using a mixture of electrically conductive and non-conductive particles in a bipolar electrolytic cell. The conductive particles form clumps or strands of material through which an electrical current can pass. This geometry is indicated in FIG. 1 where the black circles 1 represent conductive particles, and the white circles 2 represent non-conductive particles. The non-conductive particles, however, limit the length or size of the clusters of conductive particulates. Thus, the bed is prevented from acting as a shunt between the two opposite electrodes 3,4.

An additional feature of this bipolar cell is the intimate contact between conductive and non-conductive strands. In this manner the internal electrical resistance of the cell is kept to a minimum. The solution to be treated, in spite of its high resistivity, presents a minimum electrical resistance. Thus, the performance of the present invention can approach the best obtained by commercial bipolar cells which operate in the range of 1 to 15 volts.

A key feature of the present invention is the randomness of the mixture of conductive and non-conductive particulates. On a small scale, the proportion of conductive to non-conductive particulates will vary unpredictably, but as the sample size increases, the proportion will approach an average composition. Achieving randomness in practice is not easy. For example, simple mixing of the particulates by conventional means quite likely will result in stratification whereby the denser particulates lie closer to the bottom of the vessel, To avoid this problem, one approach is to add particulates one at a time in an irregular manner to form the bed.

The average proportion of conductive to non-conductive particulates can vary between wide limits. In theory, the two extremes are represented by beds with all conductive particulates and all non-conductive particulates. For example, consider a cell that has a very small cross section with electrodes 3, 4 at the ends, the cross section being so small in fact that it equates to the size of a particulate. In this case one and only one particle of non-conductive material is needed to break a short circuit between the electrodes. At the other extreme, as the distance between the electrodes becomes diminishingly small, they are separated only by a monolayer of particles. Now it takes merely one conductive particle to cause a short circuit.

In the successful application of the present invention, an important consideration is the nature of the particulates. The non-conductive particulates present relatively little difficulty. It suffices that these particles be corrosion resistant in the cell environment. They may be made, for example, of glass, ceramic such as porcelain, or plastics, e.g., polypropylene.

The choice of materials for the conductive particles, however, is much more difficult. Not only must they be good conductors of electricity, but they must be corrosion resistant. Frequently this means that they will not dissolve in acids. The fact that the conductive particulates serve as bipolar electrodes makes the problem even more intractable. Whereas some materials are suitable for cathodes, they will be attacked when used as anodes.

The most commonly used substances for bipolar cells have been carbonaceous materials. Graphite generally is the material of choice. An alternative material is a platinum plated substrate such as titanium, but the cost is a drawback. Still another material is lead.

Something should be said about the size of the particulates and their shape. Two considerations are important in determining these parameters. First, there should be a minimum restriction to the flow of solution through the cell. Second, it is desirable to achieve a maximum electrode surface for a given cell size. These two requirements are contradictory so that a compromise must be reached in determining the size of the particulates. The range of mesh sizes to be considered varies from 4 (4.76 mm) to 12 (1.68 mm) U.S. Sieve Series. Although a spherical shape is favored, practical considerations may dictate the use of uneven fragments.

The potential applications for the present invention are numerous. One of the more interesting uses is the anodic oxidation of cyanide to carbon dioxide and nitrogen. Cyanide ions are prevalent in the rinse water from many plating processes. Another application is the reduction of hexavalent chrome to the trivalent cation. Chrome plating is widely used in industry, and wastes from these processes for a long time have presented pollution control problems.

Additional applications include hydrometallurgical processes used to extract non-ferrous metals from ores. In these processes electrowinning recovers such metals as copper and nickel from solutions obtained in the leaching of ores. The ability to treat weak solutions is a benefit of the present invention.

What is claimed is:

1. A process for removing ions from solution by passing the solution through a bipolar electrolytic cell which comprises a bed of particulates, some of which are electrically conductive and some non-conductive, spaced between two electrodes across which an electrical potential is applied, said particulates being intimately mixed so as to form a bed of random composition such that the average proportion of conductive to non-conductive particulates is sufficient to form strands or clumps of conductive particulates but less than tie lowest proportion which causes an electrical shunt between the electrodes; wherein the electrically conductive particulates are selected from the group consisting of particles made of titanium plated with platinum and particles of lead.

2. A process as in claim 1 wherein the electrically non-conductive particulates are made of glass.

3. A process as in claim 1 wherein the electrically non-conductive particulates are made of ceramic.

4. A process as in claim 1 wherein the electrically non-conductive particulates are made of plastic.

* * * * *